(12) United States Patent
Novaes

(10) Patent No.: US 9,952,899 B2
(45) Date of Patent: Apr. 24, 2018

(54) AUTOMATICALLY GENERATING EXECUTION SEQUENCES FOR WORKFLOWS

(71) Applicant: GOOGLE INC., Mountain View, CA (US)

(72) Inventor: Marcos Novaes, Mountain View, CA (US)

(73) Assignee: Google LLC, Mountain View, CA (US)

( * ) Notice: Subject to any disclaimer, the term of this patent is extended or adjusted under 35 U.S.C. 154(b) by 33 days.

(21) Appl. No.: 14/511,027

(22) Filed: Oct. 9, 2014

(65) Prior Publication Data

US 2016/0103706 A1   Apr. 14, 2016

(51) Int. Cl.
| | |
|---|---|
| G06F 9/48 | (2006.01) |
| G06Q 10/06 | (2012.01) |
| G06Q 10/10 | (2012.01) |
| G06F 9/46 | (2006.01) |

(52) U.S. Cl.
CPC .......... *G06F 9/4881* (2013.01); *G06Q 10/06* (2013.01); *G06Q 10/10* (2013.01)

(58) Field of Classification Search
None
See application file for complete search history.

(56) References Cited

U.S. PATENT DOCUMENTS

| | | | | |
|---|---|---|---|---|
| 2007/0294244 | A1* | 12/2007 | Dreiling | G06F 9/44505 |
| 2011/0225565 | A1* | 9/2011 | van Velzen | G06F 9/5038 |
| | | | | 717/114 |
| 2012/0072391 | A1* | 3/2012 | Simitsis | G06Q 10/103 |
| | | | | 707/602 |
| 2015/0160974 | A1* | 6/2015 | Kishore | G06F 9/4881 |
| | | | | 718/106 |
| 2016/0350160 | A1* | 12/2016 | Hamway | H04L 41/0806 |

OTHER PUBLICATIONS

Merriam-webster, "Rule", Sep. 16, 2014, waybackmachine.*

(Continued)

*Primary Examiner* — Wynuel Aquino
(74) *Attorney, Agent, or Firm* — Fish & Richardson P.C.

(57) ABSTRACT

The present disclosure relates to automatically generating execution sequences from workflow definitions. One example method includes receiving a workflow definition including a plurality of operations, each of the plurality of operations including input attributes each associated with an input value and output attributes each associated with an output value; determining an execution sequence for the workflow defining relationships between the plurality of operations, the determining based at least in part on the one or more input attributes and associated input values, and the output attributes and associated output values for each operation, and at least in part on one or more semantic rules defining dependencies of each of the plurality of operations; and generating a directed acyclic graph representing the execution sequence including nodes each representing an operation from the plurality of operations, and vertices each representing a relationship between the plurality of operations defined by the execution sequence.

19 Claims, 9 Drawing Sheets

(56) References Cited

OTHER PUBLICATIONS

Williams, "Workflow Diagram—Taverna 2.5—myGrid developer wiki", last edited May 7, 2014, http://dev.mygrid.org.uk/wiki/display/tav250/Workflow+Diagram, 6 pages.
"What is a Workflow Management System?—Taverna", copyright 2010, http://www.taverna.org.uk/introduction/what-is-a-workflow-management-system/, 2 pages.
Williams, "Sample Workflow—Kepler", [retrieved from internet on Sep. 9, 2014], htttps://kepler-project.org/users/sample-workflows, 3 pages.
"Kepler User Manual", Version 2.4, Mar. 2013, 393 pages.
"Overview—GMOD" formerly titled "GMOD for the Biologist", http://gmod.org/wiki/Overview, last updated Oct. 7, 2013, 12 pages.
Wikipedia, "Directed Acyclic Graph", last modified Aug. 26, 2014, http://en.wikipedia.org/wiki/Directed_acyclic_graph, 10 pages.
Mitchell, "Use of Directed Acyclic Graph Analysis in Generating Instructions for Multiple Users", Copyright 2001, 6 pages.
"HTCondor™ Version 8.3.0 Manual", Center for High Throughput Computing, Univ. of Wisconsin-Madison, Aug. 12, 2014, 1014 pages.
Paraschiv, "A Topology-Based Directed Acyclic Graph Generation Strategy", CSMR, vol. 1, No. 1, Published in 2010, 7 pages.
International Search Report and Written Opinion in International Application No. US2015/052009, dated Feb. 19, 2016, 14 pages.
Wurtz, "Oz Scheduler: A Workbench for Scheduling Problems," Eighth IEEE International Conference on Tools with Artificial Intelligence, Nov. 1996, pp. 149-156.
Invitation to Pay Additional Fees and, Where Applicable, Protest Fee for International Application No. PCT/US2015/052009, dated Dec. 7, 2015, 6 pages.
Office Action issued in European Application No. 15781202.2, dated Nov. 2, 2017, 3 pages.

\* cited by examiner

AUTOMATICALLY GENERATING EXECUTION SEQUENCES FOR WORKFLOWS

BACKGROUND

Certain computing systems allow the creation of workflows including sequences of operations configured such that the output created by a previous operation is input to the next operation. For example, on many Unix-style operating systems, such sequences are provided by connecting operations (e.g., shell commands) using operators such as "|", "<", and ">." A sequence such as "ps|grep 'blah'" will cause the output of the command "ps" to be provided to the program "grep" as a stream such that the two commands run in parallel.

SUMMARY

The present disclosure relates to automatically generating execution sequences from workflow definitions.

In general, one innovative aspect of the subject matter described in this specification can be embodied in methods that include the actions of receiving a workflow definition including a plurality of operations, each of the plurality of operations including one or more input attributes each associated with an input value and one or more output attributes each associated with an output value; determining an execution sequence for the workflow defining relationships between the plurality of operations, the determining based at least in part on the one or more input attributes and associated input values, and the one or more output attributes and associated output values for each operation, and at least in part on one or more semantic rules defining dependencies of each of the plurality of operations; and generating a directed acyclic graph representing the execution sequence, the direct acyclic graph including one or nodes each representing an operation from the plurality of operations, and one or more vertices each representing a relationship between the plurality of operations defined by the execution sequence.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. By automatically determining the dependencies between operations in a workflow, the user is relieved of the time consuming and error-prone task of manually specifying these relationships, allowing workflows to be specified faster and more efficiently. Further, the techniques described herein allow automatic generation of information for executing a given workflow in a distributed execution environment such as a cloud system, thereby freeing the user from performing this task manually.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
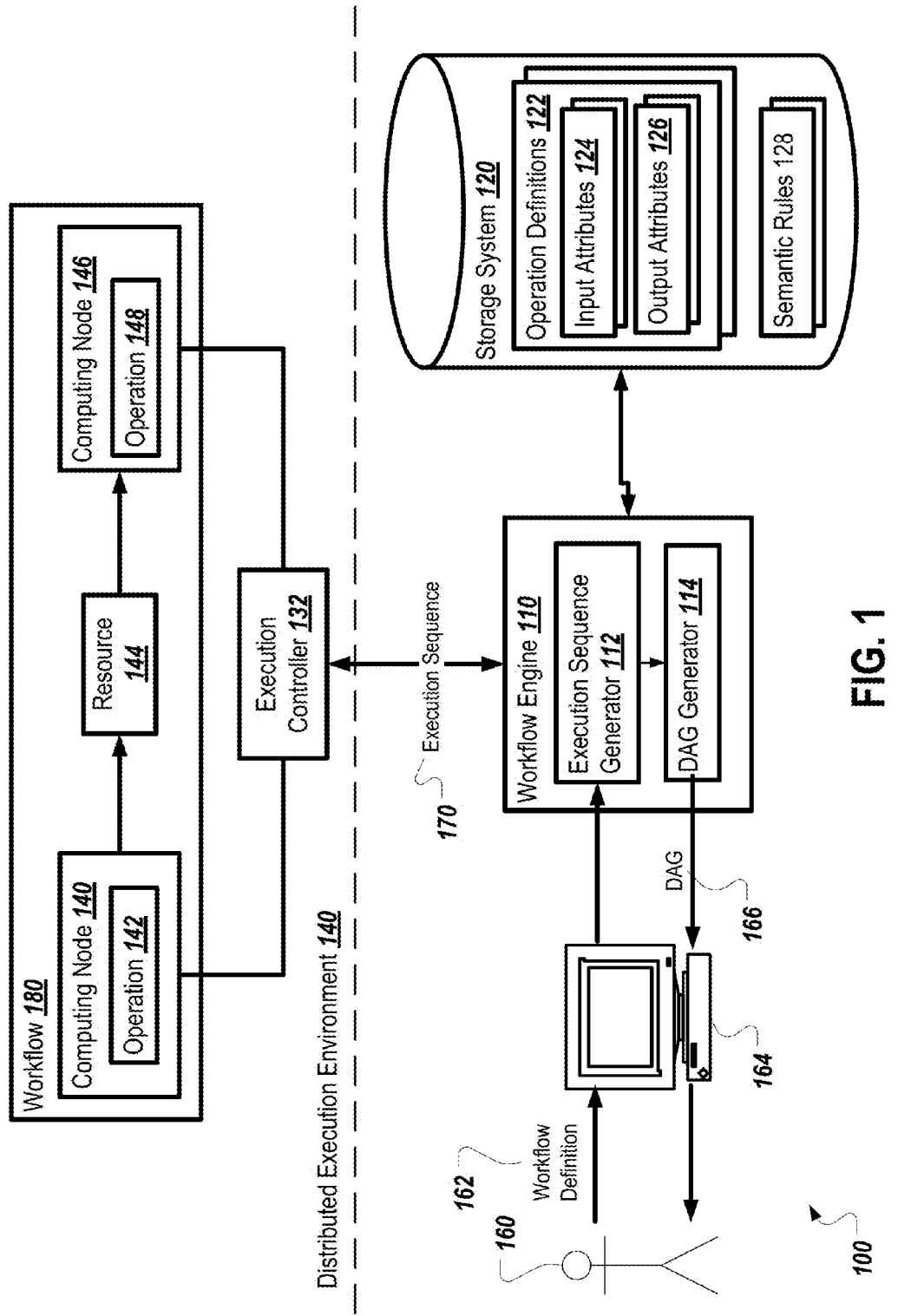
FIG. 1 is a block diagram of an environment for automatically generating execution sequences from workflow definitions.

In distributed computing, workflows including multiple operations may be constructed by providing the output of one operation, such as a software program executing on a computing device, as input to another operation, such another software program on the same or a different computing device. Using this technique, pre-existing operations may be used together to perform analysis or transformation on data sets. For example, an operation that produces an output data set ordered by a certain identifier may be used in a workflow to provide input to an operation that takes as input a data set ordered by that identifier. Complex workflows may be constructed by configuring multiple operations in this way. In addition, certain operations may produce multiple outputs or take multiple inputs, which further complicates the construction of such workflows by requiring a designer to specify the order in which the operations occur, as well as the relationships between the operations (e.g., which operation provides its output to which other operation as input). In some cases, a workflow may be visualized as a directed acyclic graph or "DAG" including a node for each operation and a vertex for each relationship between the operations.

Accordingly, the present disclosure describes techniques for automatically generating execution sequences from workflow definitions. In one example method, a workflow definition including a plurality of operations is received. Each operation may include input attributes, output attributes, and values associated with each. For example, a "sort" operation may have one input attribute of type file, and one output attribute of type file. The value of the input attribute may specify the filename of a file containing input for the "sort" operation (e.g., a list of unsorted values). The value of the output attribute may specify the filename of a file to which the "sort" operation will write its produced output (e.g., a list of sorted values). An execution sequence for the workflow is determined by defining relationships between the plurality of operations. This determination is based at least in part on the one or more input attributes and associated input values, and the one or more output attributes and associated output values for each operation, and at least in part on one or more semantic rules defining dependencies of each of the plurality of operations. A directed acyclic graph (DAG) is then generated representing the execution sequence. The DAG includes one or nodes each representing an operation from the plurality of operations, and one or more vertices each representing a relationship between the plurality of operations defined by the execution sequence. For example, each vertex between nodes may represent an operation represented by one of the nodes that provides its output to an operation represented by the other node as input.

The present disclosure also describes a graphical user interface and a method for building workflows. A user may specify the operations of a desired workflow through the user interface. The operations may then be automatically sequenced in an order of execution based on a dependency determination procedure. The implicit dependencies between operations may be determined by semantic rules derived from descriptions of the operations defining the operation's attributes. For example, the semantic rules may be derived from the UNIX command specification for workflows involving UNIX commands. The operations may be related to one another based on the definition of their respective input and output files and streams. In some cases, each file or stream may be associated unique resource identifier (URI), and operations with attribute values having the same URI may be determined to be related.

From the dependency relationships, artifacts may be produced defining a sequence of operations for the workflow. In some cases, a text file may be produced including a DAG specifying the operations and their data dependencies. In some implementations, the DAG expresses "file" dependencies and "stream" dependencies between operations as vertices between nodes. This artifact can then be used by Cloud schedulers which execute the operation sequence taking into account file and stream dependencies.

These features and additional features are described in more detail below.

FIG. 1 is a block diagram of an environment 100 for automatically generating execution sequences from workflow definitions. As shown, the environment 100 includes a workflow engine 110 in communication with a computing device 164 used by a user 160, a storage system 120, and an execution controller 132 of a distributed execution environment 140. In operation, the user 160 interacts with the computing device 164 to specify a workflow definition 162 including operations to be performed. The computing device 164 communicates the workflow definition 162 to the workflow engine 110. The workflow engine 110 analyzes the workflow definition 162 to determine the operations included in the workflow definition. The workflow engine 110 may consult the storage system 120 to determine input attributes and output attributes for the particular operations included in the workflow definition 162. Workflow definition 162 may also include values for the input and output attributes of each operation in the workflow. The workflow engine 110 analyzes the workflow definition 162 to determine relationships between the operations in the workflow. For example, if the value of an output attribute for a first operation is the same as the value of input attribute for the second operation, the second operation depends on the first operation, and must be included after the first operation in the execution sequence. In some cases, the first operation may provide its output to the second operation as a stream, indicating that the second operation can begin processing its input while the first operation is still executing. The first operation may also provide its output to the second operation is a file, indicating that second operation may not begin processing its input until the first operation is completed.

The workflow engine 110 may produce an execution sequence 170 representing the relationships between the operations included in the workflow definition 162. The workflow engine 110 may send the execution sequence to the distributed execution environment 140. The execution controller 132 may configure and execute a workflow 180 corresponding to the workflow definition 162. This functionality is described in greater detail below. Workflow engine 110 may also produce a directed acyclic graph (DAG) 166 associated with the workflow definition 162 for presentation to the user 160.

As shown, environment 100 includes a computing device 164. Although the computing device 164 shown as a desktop computer, and some implementations, the computing device 164 may be a mobile device including a touchscreen display, such as, for example, a phone, a tablet, a laptop, or another type of mobile device. In some cases, the computing device 164 may include one or more processors executing an operating system controlling operation of the computing device 164. The computing device 164 may present a user interface to the user 160 allowing user to specify a workflow definition 162. Examples of such a user interface are provided in FIGS. 3 and 4, discussed below.

The workflow definition 162 may include a plurality of operations and values for the operation's respective attributes (e.g., input attributes and output attributes). In some cases, the workflow definition 162 may not include explicit indications of the relationships between the different operations. For example, the user 160 may define a list of operations and their various input and output values for the workflow definition 162, and the workflow engine 110 may analyze the workflow definition 162 to determine the implicit relationships between the operations, thereby relieving the user 160 for specifying this information. In some implementations, the workflow definition 162 may be represented in an electronic format, including, but not limited to, an Extensible Markup Language (XML) file, an image file, a text file, a Portable Document Format (PDF) file, or another electronic format.

The environment 100 includes a workflow engine 110. In operation, the workflow engine 110 receives the workflow definition 162 from the computing device 164 and provides the execution sequence 172 distributed execution environment 140, and the DAG 166 to the computing device 164 for presentation to the user 160. In some cases, the workflow engine 110 may be a server or set of servers in communication with the computing device 164 and the distributed execution environment 140 over a communications network (not shown). The workflow engine 110 may also be a software process or set of software processes running on one or more servers.

The workflow engine 110 includes an execution sequence generator 112. The execution sequence generator 112 may receive the workflow definition 162, and generate an execution sequence 170 corresponding to the workflow definition 162. In some cases, the execution sequence generator 112 may generate the execution sequence 170 based on the operations defined in the workflow definition 162, the input and output attributes associated with the operations and their values specified in the workflow definition 162, and on the one or more semantic rules 128. For example, the execution sequence generator 112 may determine that a first operation that provides a stream of output to a second operation as input should begin before the second operation based on one of the semantic rules 128 defining such a dependency. In some cases, the execution sequence generator 112 may parse the workflow definition 162 to determine the operations and attribute values included in the workflow definition 162.

In some cases, the execution sequence generator 112 may communicate with the storage system 120 to determine the attributes for the operations specified in the workflow definition 162. In some cases, the storage system 120 may be any type of system for structured or unstructured storage of data, including, but not limited to, a database, a file system, a cloud storage system, a memory, or other types of systems. The operation definitions 122 may be stored in organized according to techniques associated with the particular type of system, such as being stored as files in the case of a file system, tables in the case of a database, or according to other techniques.

The execution sequence generator 112 may consult operation definitions 122 stored in the storage system to determine the input attributes 124 and the output attributes 126 for an operation associated with a particular operation definition 122. In some cases, the input attributes 124 and the output attributes 126 may specify a type associated with the input and output attributes for particular operation, such as, for example, stream, file, ordered set, key value pair set, or other types of attributes. The execution sequence generator 112 may use the input attributes 124 and the output attributes 126 when determining dependencies between operations. For example, the execution sequence generator 112 may determine whether particular operations in the workflow definition 162 are compatible with one another based on whether the type specified by an attribute of one operation is the same as the type specified by an attribute of another operation.

In some cases, the operation definitions 122 may include or may be generated based on documentation of the particular operations included in the workflow definition 162, including, but not limited to, Application Programming Interface (API) specifications, UNIX "man" pages, or other types of documentation.

In some cases, the execution sequence generator 112 may produce the execution sequence 170 in a format specific to the distributed execution environment 140. For example, the execution sequence 170 may include a message or set of messages sent over a network to the distributed execution environment 140 instructing it to create the operations defined by the workflow definition 162, and to configure them according to the dependencies between the operations identified by the execution sequence generator 112. Workflow 180 is an example of such a configuration, and is discussed in greater detail below.

The workflow engine 110 also includes a DAG generator 114. In operation, the DAG generator 114 may produce a visual representation of the execution sequence 170 in the form of a directed acyclic graph or DAG 166. The DAG 166 may be presented to the user 160 to show the determined execution sequence 170. In some implementations, the DAG 166 may represent each operation in the workflow definition 162 as a node in the DAG 166, and may represent each dependency between the operations as a vertex connecting two nodes. For example, the DAG 166 may include a vertex connecting nodes representing one operation depending on the output of another operation for input. In some implementations, each vertex may represent different types of relationships between the operations represented by the node. For example, one type of vertex may indicate that a later operation cannot start until the earlier operation finishes, or another type of vertex may indicate that the two operations can occur in parallel. In some implementations, the DAG 166 may be a file encoding a visual representation of the directed acyclic graph according to a particular graphics format. The DAG 166 may also include instructions to cause the computing device 164 to display the directed acyclic graph associated with the execution sequence 170.

As shown, the environment 100 includes the distributed execution environment 140. In operation, the distributed execution environment 140 may configure and execute workflows across multiple computing nodes in response to a received execution sequence 170. The distributed execution environment 140 includes the execution controller 132. In operation, the execution control 132 may control the computing nodes 141, 146 to configure them into the workflow 180 corresponding to the execution sequence 170. The computing nodes 141, 146 may be server or sets of servers within the distributed execution environment 140 operable to execute operations specified by the execution sequence 170. As shown, the computing node 141 is configured to execute the operation 142, and the computing node 146 is configured to execute the operation 148. The operation 142 and the operation 148 are associated with the resource 144. The resource 144 represents an output resource for the operation 142 and an input resource for the operation 148. Such a configuration may be implemented by the execution controller 132 in response to the execution sequence 170 indicating that the output of the operation 142 is to be provided as input to the operation 148. In some implementations, the resource 144 may be a Representational State Transfer (REST) resource, such as, for example, a server or program implementing a REST protocol such as Hypertext Transfer Protocol (HTTP).

Figure 2:
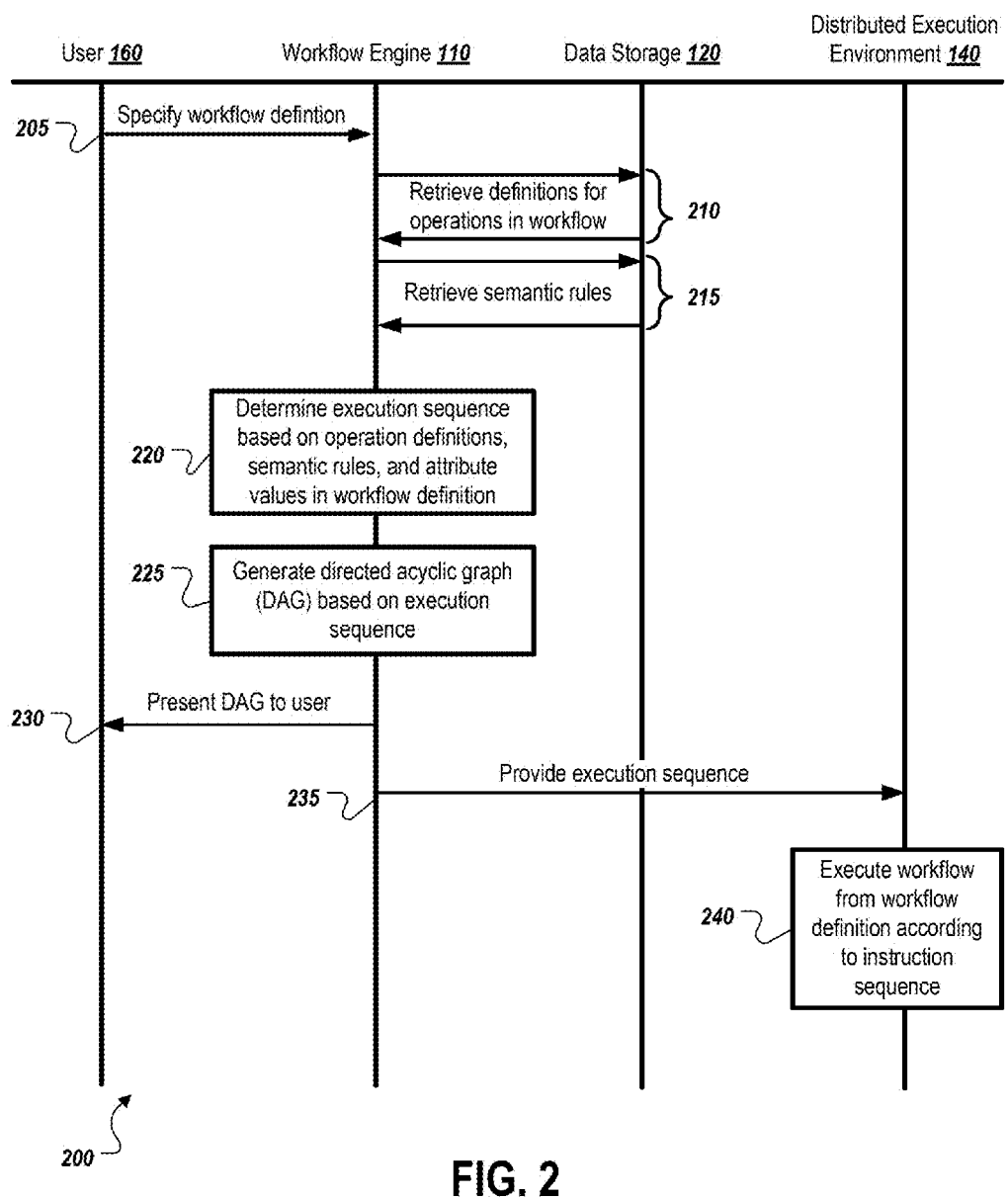
FIG. 2 is a flow diagram of an example process automatically generating execution sequences from workflow definitions.

FIG. 2 is a flow diagram of an example process 200 for automatically generating execution sequences from workflow definitions. At 205, the user 160 specifies a workflow definition to the workflow engine 110, as previously described relative to FIG. 1. A 210, the workflow engine 110 retrieves definitions for operations in the workflow specified workflow from the storage system 120. In some cases, the workflow engine 110 may submit a database query, filesystem read request, cloud storage request, or other type of request. At 215, the workflow engine 110 retrieves semantic rules from the storage system 120. At 220, the workflow engine 110 determines that execution sequence based on the operation definitions, the semantic rules, and the attribute values in the workflow definition. At 225, the workflow engine 110 generates a directed acyclic graph based on the execution sequence. At 230, the workflow engine 110 presents the directed acyclic graph to the user 160. At 235, the workflow engine 110 provides the execution sequence to the distributed execution environment 140, which configures and executes a workflow based on the execution sequence (240).

The actions 220 through 240 may occur in different orders. For example, the execution sequence may be provided by the workflow engine 110 to the distributed execution environment 140 before the directed acyclic graph is generated based on the instruction sequence. In such a case, the distributed execution environment 140 may execute the workflow (240) in parallel with the workflow engine 110 generating the directed acyclic graph at 225.

Figure 3:
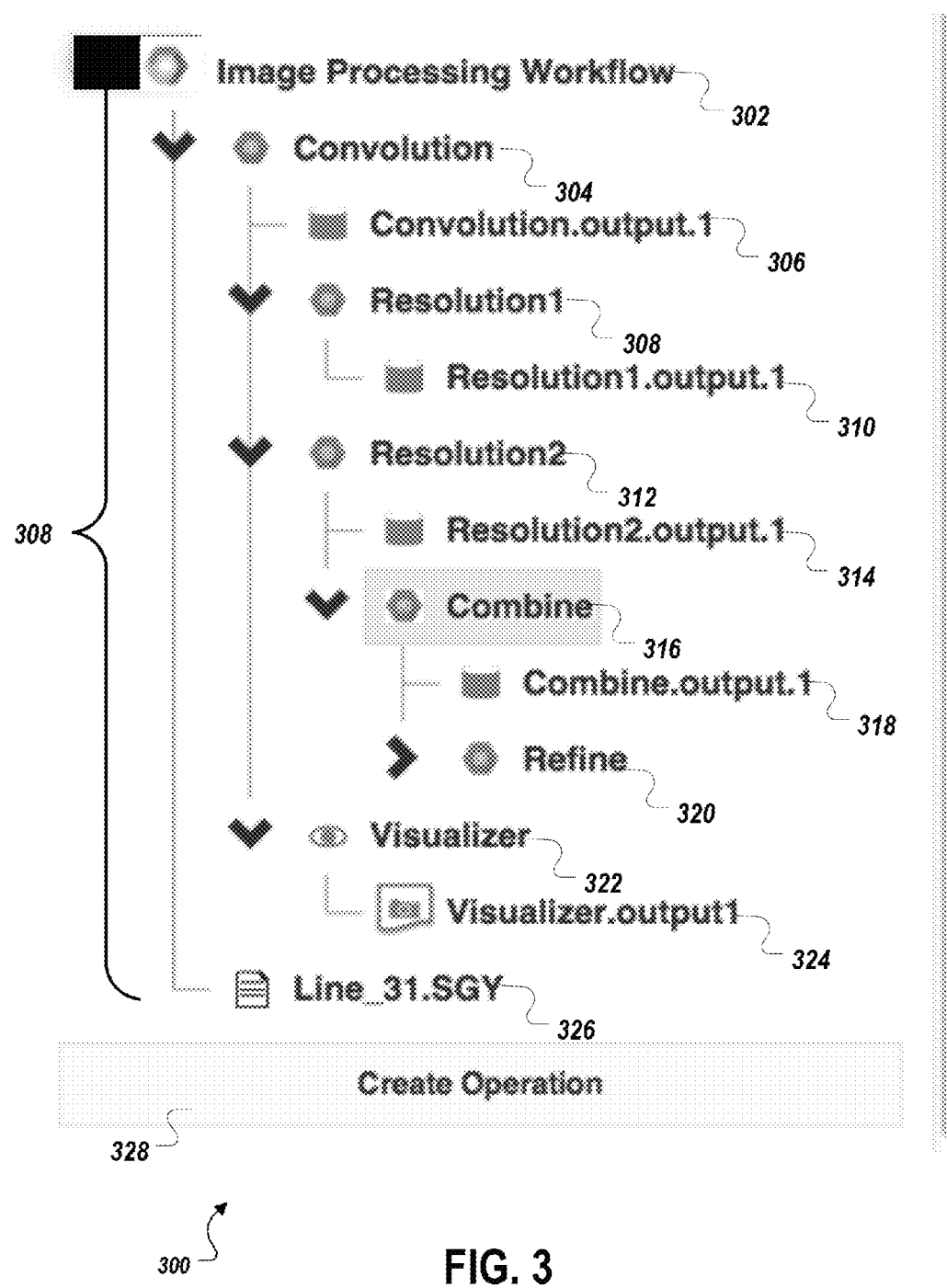
FIG. 3 is a block diagram showing an example user interface for specifying a workflow definition.

FIG. 3 is a block diagram showing another example user interface 300 for specifying a workflow definition. The user interface 300 shows a workflow 308. The workflow 308 includes a workflow icon 302 indicating the name of the workflow ("Image Processing Workflow"). The workflow 308 also includes operations 304, 308, 312, 316, 320, and 322, and associated attributes 306, 310, 314, 318, 324, and 326.

In some cases, the user interface 300 may guide the user through the process of defining operations. The attributes of type INPUT and OUTPUT associated with the operations are related to unique resource identifiers (URIs). The interface 300 assists the user in associating URIs to INPUT and OUTPUT resources using a hierarchical resource browser. In some implementations such URIs correspond to objects, stored in a distributed processing system. The interface 300 may determine the INPUT FILE and OUTPUT FILE relationships by applying semantic rules to the attributes of the operation. Such determination may also be made by a separate system, such as workflow engine 110 described relative to FIG. 1. In some cases, the semantic rules follow the definition of the syntax of specific UNIX commands. For example, the command syntax may specify an INPUT relationship using an attribute of type "flag" such as "i" and the OUTPUT as "o". In other cases the input or output relationship is defined by the position of a parameter in a command line. Such input and output parameters correspond to files in a file system. The UNIX command semantic rules also define INPUT STREAMS and OUTPUT STREAMS. The STREAM semantics imply that INPUT and OUTPUT relationships can happen with operations that are executed concurrently. Such relationship is expressed with the concept of a PIPE. Multiple operations can be chained in a concurrent pipeline. UNIX streams can also be redirected to FILES using redirection characters (<,>). and the concept of a PIPE, expressed with the character 1. In some cases, the above described UNIX semantic rules may be used to define operations and to automatically determine the required execution sequence of such operations.

In some cases, the inference of the dependencies may be made according to various techniques. In some cases, a workflow is comprised of a set of operations, and the user may specify these operations by creating them within the user interface 300. In some cases, each operation may include several attributes. For example, using the UNIX model the general attribute schema is as follows: Operation Type Attributes: Operation Type Operation Name Operation Flags Operation Arguments Operation Streams The user interface 300 may guide the user in defining the operation attributes using specific forms. Such forms may adapt dynamically according to the specific context of the definition step. For example, the user may select the operation name for a particular operation from a list within the form, and the user interface 300, in response, may build and populate forms with data specific for the specified operation. For each specific operation, the user interface 300 may recognize the FLAGS, ARGUMENTS and STREAMS need to be handled with specific definition methods. The user interface 300 can be configured by providing the semantics of each named command using a specific language. In one example, the operation semantics can be expressed using name value pairs in the JSON language as follows. The flag and parameter options which relate to INPUT and OUTPUT files and streams are marked with specific symbols, such as "I" and "O". The user interface 300 may then dynamically build forms to guide the user to specific processes concerning INPUT and OUTPUT marked attributes.

Figure 4:
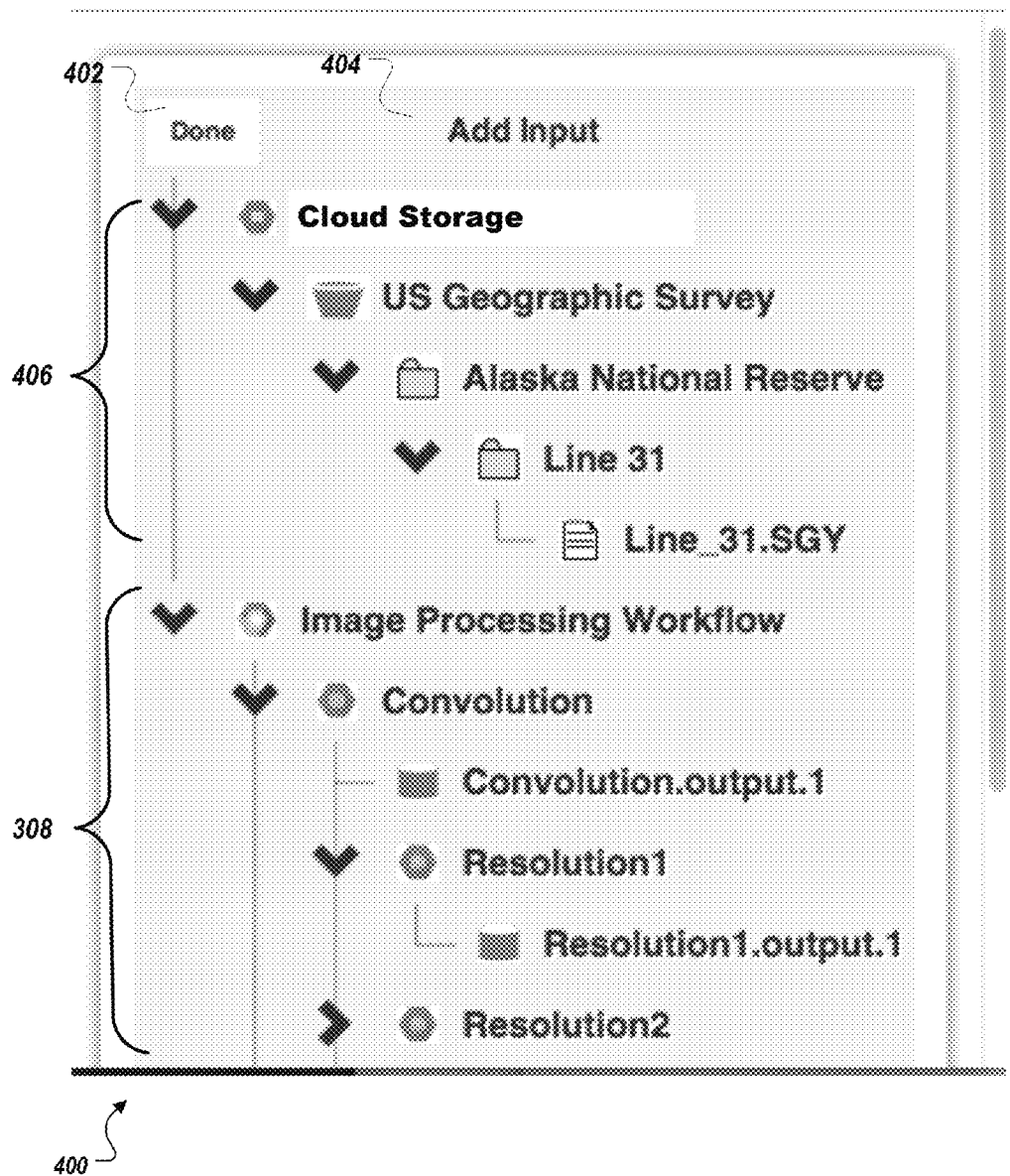
FIG. 4 is a block diagram showing another example user interface for specifying a workflow definition.

FIG. 4 is a block diagram showing an example user interface 400 for specifying an input resource in a workflow definition. As shown, the user interface 400 shows an input resource browser 406 for specifying an input resource for the workflow 308. The input resource browser 406 may allow a user to specify the input resource by browsing a storage hierarchy and ultimately selecting a file to use as an input resource. For example, in the user interface 400, the user has selected "Cloud Storage," then the "US Geographic Survey" directory, then the "Alaska National Reserve" directory, then the "Line 31" directory, and finally the file "Line_31.SGY." In some cases, the input resource browser may be initiated by activating the add input button 404, and the input resource chosen by the browser may be confirmed by activating the done button 402.

Figure 5:
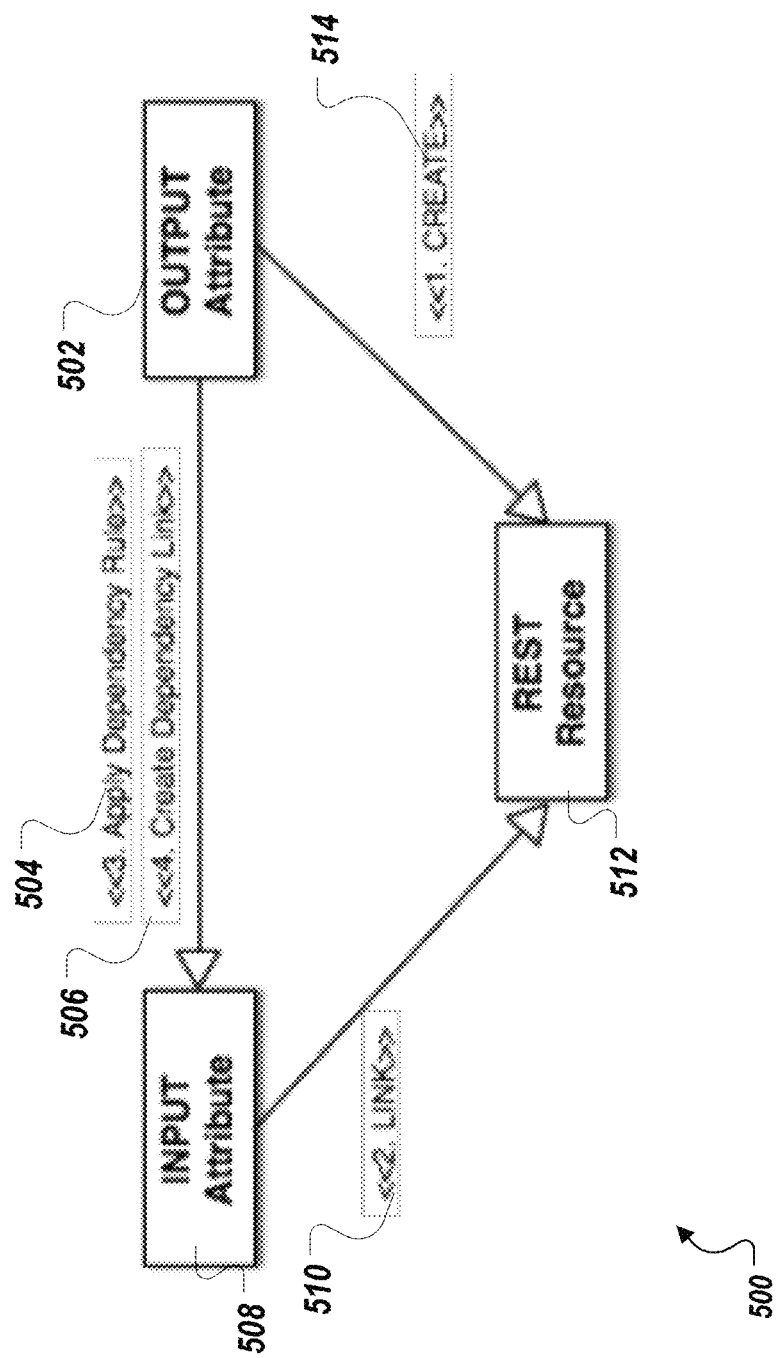
FIG. 5 is a block diagram of an example configuration of an input attribute and output attribute linked by a REST resource.

FIG. 5 is a block diagram of an example process 500 of an input attribute 502 and output attribute 508 being linked by a REST resource 512. In some cases, the process 500 may be performed by the execution controller 132 or workflow engine 110 in FIG. 1, by a combination of both components, or by other components. At 514, the REST resource 512 is created for the output attribute 502. In some cases, the execution controller 132 may create the REST resource 512 for each output attribute defined in an execution sequence. At 504, dependency rule is applied between the output attribute 502 and the input attribute 508. For example, the applying the dependency rule may include determining the type of dependency (e.g., file, stream, etc.) between the input attribute output attribute 502 and the input attribute 508. At 506, a dependency link 510 is created between the input attribute 508 and the rest resource 512. The dependency link 510 will cause the contents of the REST resource 512 to be delivered to the operation associated with the input attribute 508 according to the type of the link 510. For example, if the dependency is a stream dependency, output written to the REST resource 512 may be provided to the operation associated with the input attribute 508 for processing. If the dependency is a file dependency, the operation associated with the input attribute 508 may receive all the output written to the rest resource 512 at once when the operation associated with the output attribute 502 completes.

Figure 6:
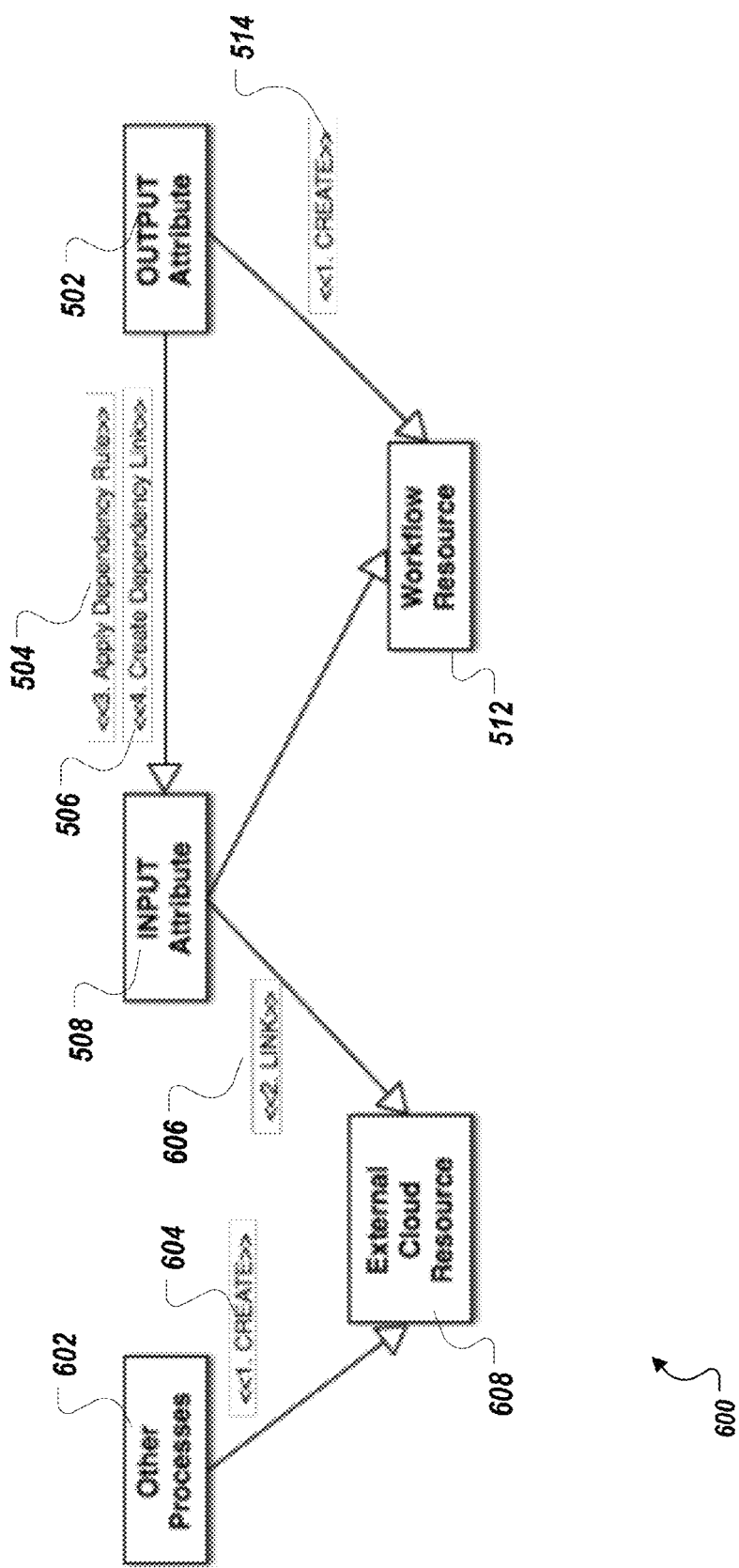
FIG. 6 is a block diagram of an example configuration in which an input attribute is read from an external cloud resource.

FIG. 6 is a block diagram of an example configuration 600 in which the input attribute 508 is read from an external cloud resource. As shown, at 604, an external process 602 may create a cloud resource 608 and right output to it. At 606, the input attribute 508 is linked to the cloud resource 608, and the operation associated with the input attribute 508 receives the contents of the cloud resource 608 as input as described relative to FIG. 5 with respect to the REST resource 512.

Figure 7:
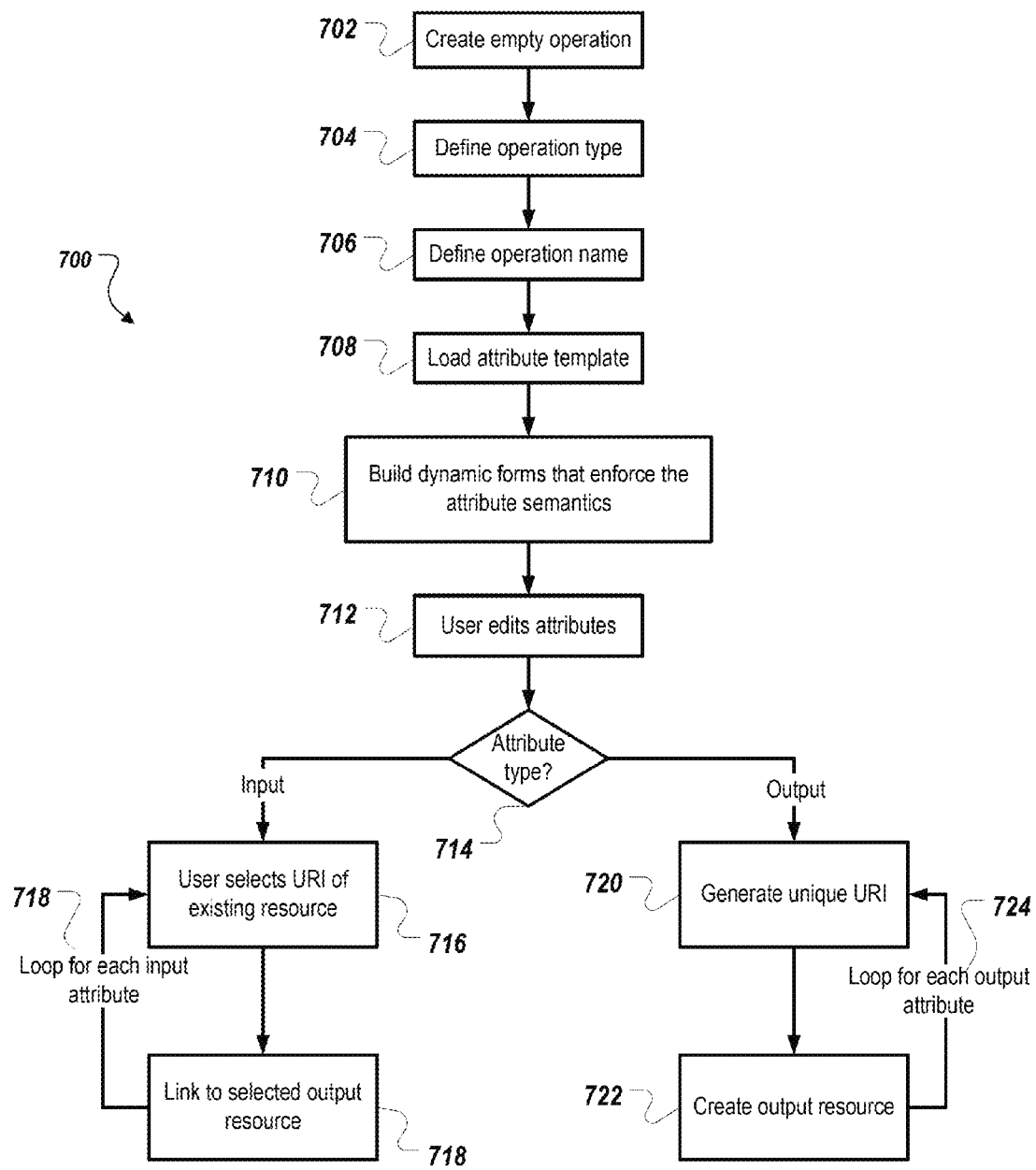
FIG. 7 is a flow diagram of an example process for automatically generating execution sequences from workflow definitions.

FIG. 7 is a flow diagram of an example process 700 for allowing a user to specify a workflow definition. In some cases, the process 700 may be implemented by the user interface 300 to allow the user to specify the workflow. At 702, an empty operation is created. In some cases, the empty operation may be created in response to the user activating a create operation button. At 704, the user selects an operation type. At 706, the user selects an operation name. At 708, an attribute template is loaded for the selected operation. In some cases, the attribute template may be loaded from an operation definition associated with the selected operation, such as the operation definitions 122 described relative to FIG. 1. At 710, dynamic forms are billed that enforce the attribute semantics. For example, the dynamic forms may allow the user to set values associated with the particular type of attributes for the selected operation. At 712, the user may edit the attributes to the selected operation, such as, for example, by specifying values associated with the attributes.

At 714, the process 700 branches for input and output attributes. For each input attribute, the process 700 allows the user to select a URI of an existing resource at 716. A 718, the input resource is linked to the output resource associated with selected URI. For each output attribute, the process 700 generates a unique URI at 720, and creates an output resource at 722.

Figure 8:
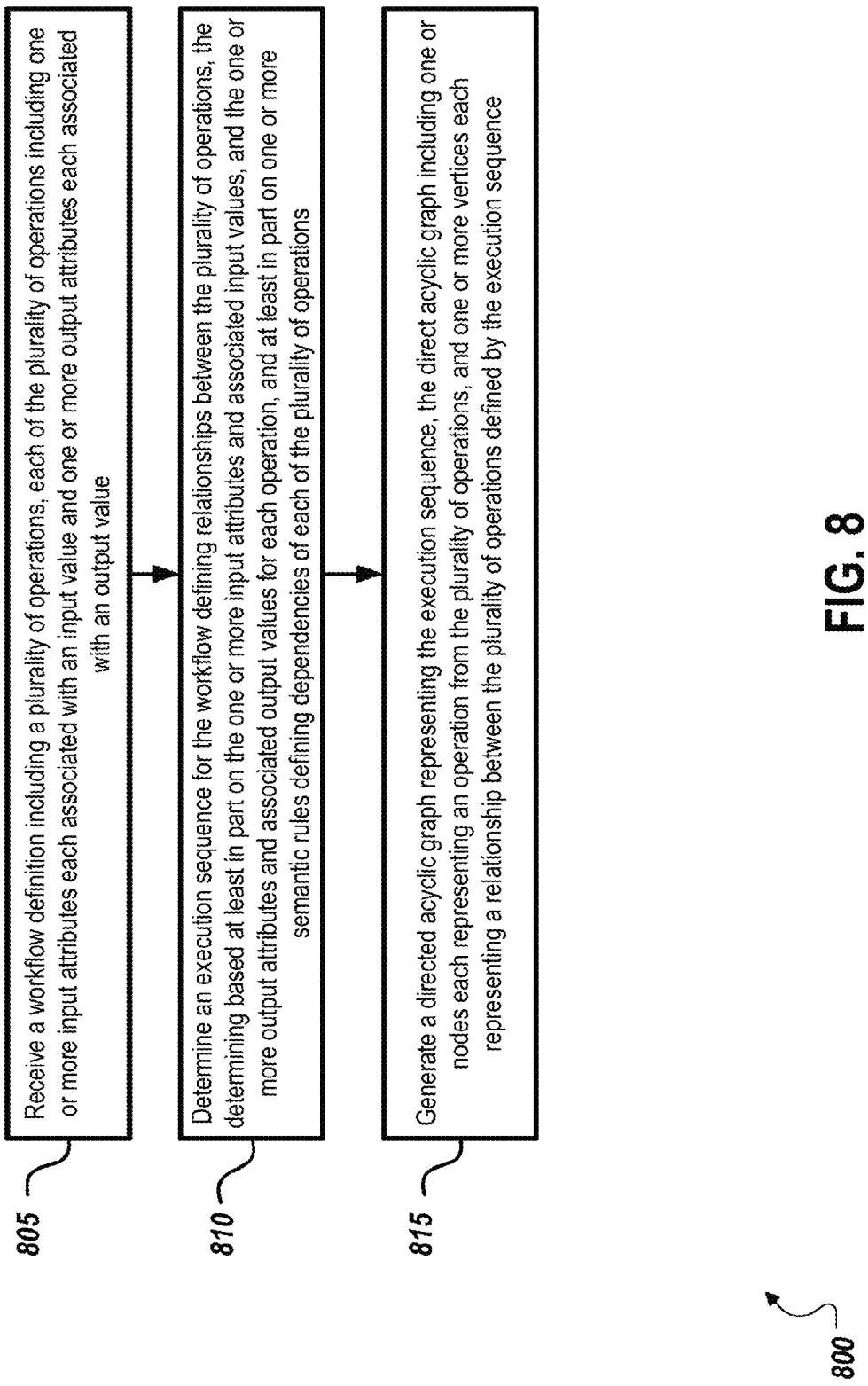
FIG. 8 is a flow diagram of another example process for automatically generating execution sequences from workflow definitions.

FIG. 8 is a flow diagram of another example process for automatically generating execution sequences from workflow definitions. At 805, a workflow definition is received including a plurality of operations, each of the plurality of operations including one or more input attributes each associated with an input value and one or more output attribute each associated with an output value. In some cases, the definition of the workflow is received via a user interface configured to allow a user to specify the plurality of operations, the input value for each of the one or more input attributes for each operation, and the output value for each of the one or more output attributes for each operation. The user interface may be configured to allow the user to specify the plurality of operations, the input value for each of the one or more input attributes for each operation, and the output value for each of the one or more output attributes for each operation from a mobile device. In some cases, the input and output attributes represent files and the associated values for each attribute represent file names of files to be read as input or produced as output by the associated operation. In some cases, the input and output attributes represent data streams and the associated values for each attribute represent URIs of streams to be read as input or produced as output by the associated operation. In some implementations, each operation is associated with a software program and the one or more input attributes and output attributes associated with the operation are retrieved from a program description associated with the software program.

At 810, and execution sequence is determined for the workflow defining relationships between the plurality of operations. The determination is based at least in part on the one or more input attributes and the associated input values, and the one or more output attributes in the associated output values for each operation. The determination is also based at least in part on one or more semantic rules defining dependencies of each of the plurality of operations. In some cases, each relationship between the plurality of operations represents an output resource generated by a first operation from the plurality of operations and used as input by second operation from the plurality of operations different than the first operation.

At 815, a directed acyclic graph is generated representing the execution sequence, the directed acyclic graph including one or more nodes each representing an operation from the plurality of operations, and one or more vertices each representing a relationship between the plurality of operations defined by the execution sequence. In some cases, a graphical representation of the generated directed acyclic graph may be presented by a display device. The workflow may be executed based on the execution sequence represented by the directed acyclic graph by a plurality of computing devices connected by a network.

Figure 9:
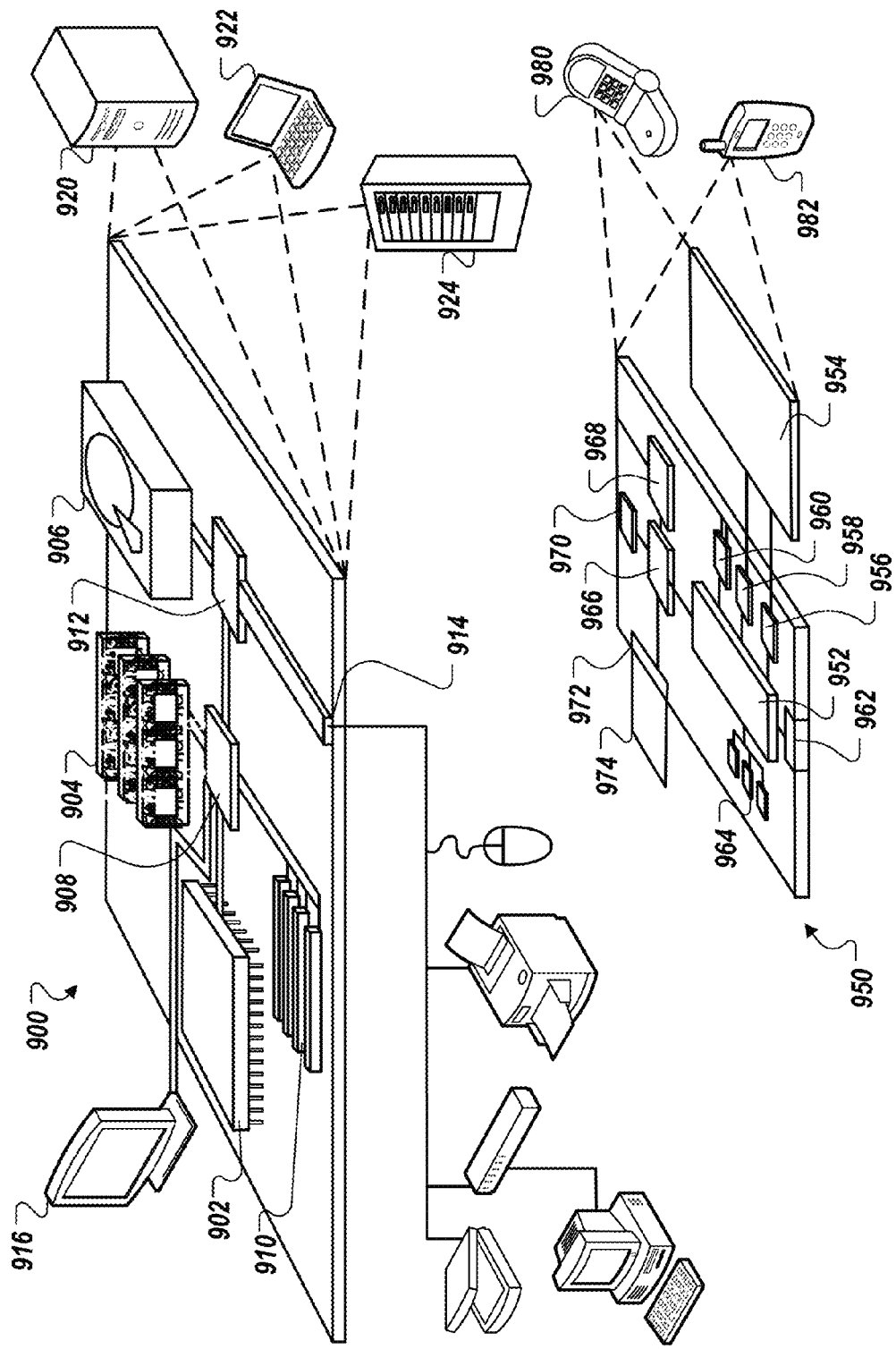
FIG. 9 is a block diagram of an example computing device.

FIG. 9 is a block diagram of computing devices 900, 950 that may be used to implement the systems and methods described in this document, as either a client or as a server or plurality of servers. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. Additionally computing device 900 or 950 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed interface 908 manages bandwidth-intensive operations for the computing device 900, while the low speed interface 912 manages lower bandwidth-intensive operations. Such allocation of functions is exemplary only. In one implementation, the high-speed interface 908 is coupled to memory 904, display 916 (e.g., through a graphics processor or accelerator), and to high-speed expansion ports 910, which may accept various expansion cards (not shown). In the implementation, low-speed interface 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. Additionally, the processor may be implemented using any of a number of architectures. For example, the processor 952 may be a CISC (Complex Instruction Set Computers) processor, a RISC (Reduced Instruction Set Computer) processor, or an MISC (Minimal Instruction Set Computer) processor. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provided as a security module for device 950, and may be programmed with instructions that permit secure use of device 950. In addition, secure applications may be provided via the SIMM cards, along with additional information, such as placing identifying information on the SIMM card in a non-hackable manner.

The memory 964 may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a filesystem. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method executed by one or more processors, the method comprising:
   receiving a workflow definition including a plurality of operations, each of the plurality of operations including one or more input attributes each associated with an input value and specifying an input value type of the input value, and one or more output attributes each associated with an output value type and specifying an output value type of the output value;
   determining an execution sequence for the workflow that defines relationships between the plurality of operations, the determining of the execution sequence for the workflow that defines relationships between the plurality of operations being based at least in part on the one or more input attributes and the associated input values, and the one or more output attributes and the associated output values for each of the plurality of operations, and being based at least in part on one or more semantic rules defining dependencies of each of the plurality of operations, the semantic rules being derived from descriptions of the plurality of operations defining the one or more input attributes and the one or more output attributes of different types of operations including types for each operation in the plurality of operations, the determining comprising:
   parsing text in the workflow definition according to the semantic rules to identify the input value and the input value type of a first operation based at least on the type of the first operation;
   determining that the input value identified for the first operation from the workflow definition is a unique resource identifier that is the-same as another unique resource identifier indicated in the workflow definition as the output value of a second operations and the input value type identified for the first operation from the workflow definition is the-same as another input value type indicated in the workflow definition as the output value type for the second operation; and
   in response to determining that the input value identified for the first operation from the workflow definition is the unique resource identifier that is the-same as the another unique resource identifier indicated in the workflow definition as the output value of the second operations and the input value type identified for the first operation from the workflow definition is the-same as the another input value type indicated in the workflow definition as the output value type for the second operation, defining in the execution sequence a relationship reflecting that the first operation begins after the second operation and the output of the second operation is provided as input to the first operation;
   generating a directed acyclic graph representing the determined execution sequence for the workflow that defines relationships between the plurality of operations, the directed acyclic graph including one or more nodes, each of the one or more nodes representing an operation from the plurality of operations, and one or more vertices, each of the one or more vertices representing a relationship between the plurality of operations defined by the execution sequence; and
   invoking the workflow on a plurality of computing devices connected by a network based on the determined execution sequence represented by the directed acyclic graph.

2. The method of claim 1, further comprising generating user interface data that defines a user interface and that causes the definition of the workflow to be received via the user interface, the user interface configured to allow a user to specify the plurality of operations, the input value for each of the one or more input attributes for each operation, and the output value for each of the one or more output attributes for each operation.

3. The method of claim 2, wherein the user interface is configured to allow the user to create a new operation, and to select an output value for a particular operation from the plurality of operations as an input value for the new operation.

4. The method of claim 2, wherein the user interface is configured to allow the user to specify the plurality of operations, the input value for each of the one or more input attributes for each operation, and the output value for each of the one or more output attributes for each operation from a mobile device.

5. The method of claim 4, wherein the user interface is configured to present the workflow definition as a tree structure derived from the determined relationships between the plurality of operations.

6. The method of claim 5, wherein a first operation having a single input value is represented as a child of a second operation having an output value matching the single input value.

7. The method of claim 5, wherein a first operation having a plurality of input values corresponding to output values of a plurality of second operations is represented as a child of the second operation having a highest tree rank property of the plurality of second operations.

8. The method of claim 1, wherein the one or more input attributes represent files and the associated input value for each input attribute represents a file identifier of a file to read as input by the operation during execution.

9. The method of claim 8, wherein the file identifier includes a file name identifying the file within a file system.

10. The method of claim 1, wherein the one or more output attributes represent files and the associated output value for each output attribute represents a file identifier of a file to which the operation writes output during execution.

11. The method of claim 10, wherein the file identifier includes a file name identifying the file within a file system.

12. The method of claim 1, wherein the one or more input attributes represent data streams and the associated input value for each input attribute represents a steam identifier of a data stream to read as input by the operation during execution.

13. The method of claim 12, wherein the stream identifier includes a Uniform Resource Identifier (URI) identifying the data stream.

14. The method of claim 1, wherein the one or more output attributes represent data streams and the associated output value for each output attribute represents a stream identifier of a data stream to which the operation writes output during execution.

15. The method of claim 1, further comprising presenting, by a display device, a graphical representation of the generated directed acyclic graph.

16. The method of claim 1, wherein each relationship between the plurality of operations represents an output resource generated by a first operation from the plurality of operations and used as input by second operation from the plurality of operations different than the first operation.

17. The method of claim 1, wherein each operation is associated with a software program and the one or more input attributes and output attributes associated with the operation are retrieved from a program description associated with the software program.

18. A non-transitory computer-readable medium storing instructions operable when execute, to cause at least one processor to perform operations comprising:
receiving a workflow definition including a plurality of operations, each of the plurality of operations including one or more input attributes each associated with an input value and specifying an input value type of the input value, and one or more output attributes each associated with an output value and specifying an output value type of the output value;
determining an execution sequence for the workflow that defines relationships between the plurality of operations, the determining of the execution sequence for the workflow that defines relationships between the plurality of operations being based at least in part on the one or more input attributes and the associated input values, and the one or more output attributes and the associated output values for each of the plurality of operations, and being based at least in part on one or more semantic rules defining dependencies of each of the plurality of operations, the semantic rules being derived from descriptions of the plurality of operations defining the one or more input attributes and the one or more output attributes of different types of operations including types for each operation in the plurality of operations, the determining comprising:
parsing text in the workflow definition according to the semantic rules to identify the input value and the input value type of a first operation based at least on the type of the first operation;
determining that the input value identified for the first operation from the workflow definition is a unique resource identifier that is the-same as another unique resource identifier indicated in the workflow definition as the output value of a second operations and the input value type identified for the first operation from the workflow
definition is the-same as another input value type indicated in the workflow definition as the output value type for the second operation; and
in response to determining that the input value identified for the first operation from the workflow definition is the unique resource identifier that is the-same as the another unique resource identifier indicated in the workflow definition as the output value of the second operations and the input value type identified for the first operation from the workflow definition is the-same as the another input value type indicated in the workflow definition as the output value type for the second operation, defining in the execution sequence a relationship reflecting that the first operation begins after the second operation and the output of the second operation is provided as input to the first operation;
generating a directed acyclic graph representing the determined execution sequence for the workflow that defines relationships between the plurality of operations, the directed acyclic graph including one or more nodes, each of the one or more nodes representing an operation from the plurality of operations, and one or more vertices, each of the one or more vertices representing a relationship between the plurality of operations defined by the execution sequence; and
invoking the workflow on a plurality of computing devices connected by a network based on the determined execution sequence represented by the directed acyclic graph.

19. A system comprising: memory for storing data; and
one or more processors operable to perform operations comprising: receiving a workflow definition including a plurality of operations, each of the receiving a workflow definition including a plurality of operations, each of the plurality of operations including one or more input attributes each associated with an input value and specifying an input value type of the input value, and one or more output attributes each associated with an output value and specifying an output value type of the output value;
determining an execution sequence for the workflow that defines relationships between the plurality of operations, the determining of the execution sequence for the workflow that defines relationships between the plurality of operations being based at least in part on the one or more input attributes and the associated input values, and the one or more output attributes and the associated output values for each of the plurality of operations, and being based at least in part on one or more semantic rules defining dependencies of each of the plurality of operations, the semantic rules being derived from descriptions of the plurality of operations defining the one or more input attributes and the one or more output attributes of different types of operations including types for each operation in the plurality of operations, the determining comprising:

parsing text in the workflow definition according to the semantic rules to identify the input value and the input value type of a first operation based at least on the type of the first operation;

determining that the input value identified for the first operation from the workflow definition is a unique resource identifier that is the-same as another unique resource identifier indicated in the workflow definition as the output value of a second operations and the input value type identified for the first operation from the workflow definition is the-same as another input value type indicated in the workflow definition as the output value type for the second operation; and in response to determining that the input value identified for the first operation from the workflow definition is the unique resource identifier that is the-same as the another unique resource identifier indicated in the workflow definition as the output value of the second operations and the input value type identified for the first operation from the workflow definition is the-same as the another input value type indicated in the workflow definition as the output value type for the second operation, defining in the execution sequence a relationship reflecting that the first operation begins after the second operation and the output of the second operation is provided as input to the first operation;

generating a directed acyclic graph representing the determined execution sequence for the workflow that defines relationships between the plurality of operations, the directed acyclic graph including one or more nodes, each of the one or more nodes representing an operation from the plurality of operations, and one or more vertices, each of the one or more vertices representing a relationship between the plurality of operations defined by the execution sequence; and invoking the workflow on a plurality of computing devices connected by a network based on the determined execution sequence represented by the directed acyclic graph.

\* \* \* \* \*